(12) United States Patent
Shin et al.

(10) Patent No.: US 11,170,231 B2
(45) Date of Patent: Nov. 9, 2021

(54) ELECTRONIC DEVICE AND ELECTRONIC DEVICE CONTROL MEIHOD

(71) Applicant: Samsung Electronics Co., Ltd., Gyeonggi-do (KR)

(72) Inventors: Sangmin Shin, Gyeonggi-do (KR); Gangheok Kim, Gyeonggi-do (KR); Yongwook Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 194 days.

(21) Appl. No.: 16/482,357

(22) PCT Filed: Feb. 28, 2018

(86) PCT No.: PCT/KR2018/002427
§ 371 (c)(1),
(2) Date: Jul. 31, 2019

(87) PCT Pub. No.: WO2018/159989
PCT Pub. Date: Sep. 7, 2018

(65) Prior Publication Data
US 2021/0133464 A1    May 6, 2021

(30) Foreign Application Priority Data
Mar. 3, 2017 (KR) .......................... 10-2017-0027787

(51) Int. Cl.
*G06K 9/00* (2006.01)
*G06T 7/13* (2017.01)
*G08G 1/16* (2006.01)

(52) U.S. Cl.
CPC ............ *G06K 9/00798* (2013.01); *G06T 7/13* (2017.01); *G08G 1/167* (2013.01)

(58) Field of Classification Search
None
See application file for complete search history.

(56) References Cited

U.S. PATENT DOCUMENTS

| | | | |
|---|---|---|---|
| 2004/0016870 A1* | 1/2004 | Pawlicki | G06K 9/52 250/208.1 |
| 2012/0154588 A1* | 6/2012 | Kim | G06K 9/4633 348/148 |
| 2016/0055751 A1 | 2/2016 | Park | |
| 2016/0350603 A1* | 12/2016 | Suddamalla | G06K 9/4604 |

(Continued)

FOREIGN PATENT DOCUMENTS

| | | | |
|---|---|---|---|
| JP | 2017-045261 | * | 3/2017 |
| JP | 2017-045261 A | | 3/2017 |

(Continued)

*Primary Examiner* — Delomia L Gilliard
(74) *Attorney, Agent, or Firm* — Cha & Reiter, LLC

(57) ABSTRACT

An electronic device is disclosed. The disclosed electronic device comprises: a camera module; one or more processors electrically connected to the camera module; and a memory electrically connected to the processors, wherein, when the electronic device operates, the memory can store instructions for making the processors generate an image by using the camera module, calculate angles formed by a virtual horizontal line and a plurality of straight lines included in the image, and select two straight lines on the basis of the calculated angles. Additional various examples are possible.

14 Claims, 10 Drawing Sheets

(a)

(b)

(56) References Cited

U.S. PATENT DOCUMENTS

2017/0140227 A1\* 5/2017 Takemura .............. G08G 1/166
2018/0150700 A1\* 5/2018 Kaneko ..................... G06T 7/97
2019/0205663 A1\* 7/2019 Ji ........................... G08G 1/167

FOREIGN PATENT DOCUMENTS

| KR | 10-2013-0007243 A | | 1/2013 |
|---|---|---|---|
| KR | 10-1268473 B1 | | 6/2013 |
| KR | 101268473 B1 | \* | 6/2013 |
| KR | 10-1473866 B1 | | 12/2014 |
| KR | 10-1584907 B1 | | 1/2016 |
| KR | 101584907 B1 | \* | 1/2016 |
| KR | 10-2016-0023409 A | | 3/2016 |

\* cited by examiner

ELECTRONIC DEVICE AND ELECTRONIC DEVICE CONTROL METHOD

CROSS REFERENCE TO RELATED APPLICATIONS

This application is a National Phase Entry of PCT International Application No. PCT/KR2018/002427, which was filed on Feb. 28, 2018, and claims a priority to Korean Patent Application No. 10-2017-0027787, which was filed on Mar. 3, 2017, the contents of which are incorporated herein by reference.

TECHNICAL FIELD

Various embodiments of the disclosure relate to an operating method of detecting a lane in which a transport apparatus is diving using an electronic device and an apparatus performing the operation.

BACKGROUND ART

Recently, a diving assistance system is mounted on a transport apparatus in order to help a drivers decision to improve the ability to handle an accident. Particularly, the number of transport apparatuses increases, which have a function for detecting the lane in which the transport apparatus is driving using a camera module mounted on the transport apparatus and controlling the operation of the transport apparatus when the transport apparatus deviates from the lane or notifying a driver of the deviation.

Furthermore, the number of applications, such as a driving assistance system, also increases in an electronic device on which a camera module is mounted, such as a smartphone. Accordingly, if a driving assistance system is not present in a transport apparatus, users may easily obtain information related to driving using smartphones.

DISCLOSURE OF INVENTION

Technical Problem

If a function for detecting a lane is performed using an electronic device on which a camera module is mounted, such as a smartphone, a lane detected by the smartphone may not be identical with the lane in which a transport apparatus is driving depending on the location where the smartphone is mounted on the transport apparatus and the direction toward the camera module included in the smartphone is directed.

The disclosure may provide a method capable of accurately detecting the lane in which a transport apparatus is diving although the location where an electronic device including a camera module is positioned is out of the center of the transport apparatus and the direction toward which the camera module is directed is not identical with the direction in which the transport apparatus is diving, and an electronic device supporting the method.

Solution to Problem

According to an embodiment, an electronic device includes a camera module, at least one processor electrically connected to the camera module, and a memory electrically connected to the processor. When the electronic device operates, the memory may store instructions enabling the processor to generate an image using the camera module, to calculate angles formed by a plurality of straight lines and a virtual horizontal line included in the image, and to select two straight lines based on the calculated angles.

According to an embodiment, a method of controlling an electronic device may include generating an image using a camera module, detecting a plurality of straight lines included in the generated image, and calculating angles formed by the plurality of straight lines and a virtual horizontal line and selecting two straight lines based on the calculated angles.

Advantageous Effects of Invention

According to an embodiment of the disclosure, a plurality of straight lines included in an image generated using a camera module is detected, and angles formed by the plurality of straight lines and a virtual horizontal line are calculated. Two angles that belong to the calculated angles and that are a preset value or less in the difference between the absolute values of the two angles are calculated in order of greater absolute value. The virtual horizontal line and two straight lines forming the two angles are selected, and a face including the two straight lines is selected as a lane. Accordingly, an electronic device can detect the lane in which a transport apparatus is driving although the direction of the camera module is not identical with the direction in which the transport apparatus is driving.

MODE FOR THE INVENTION

Figure 1A:
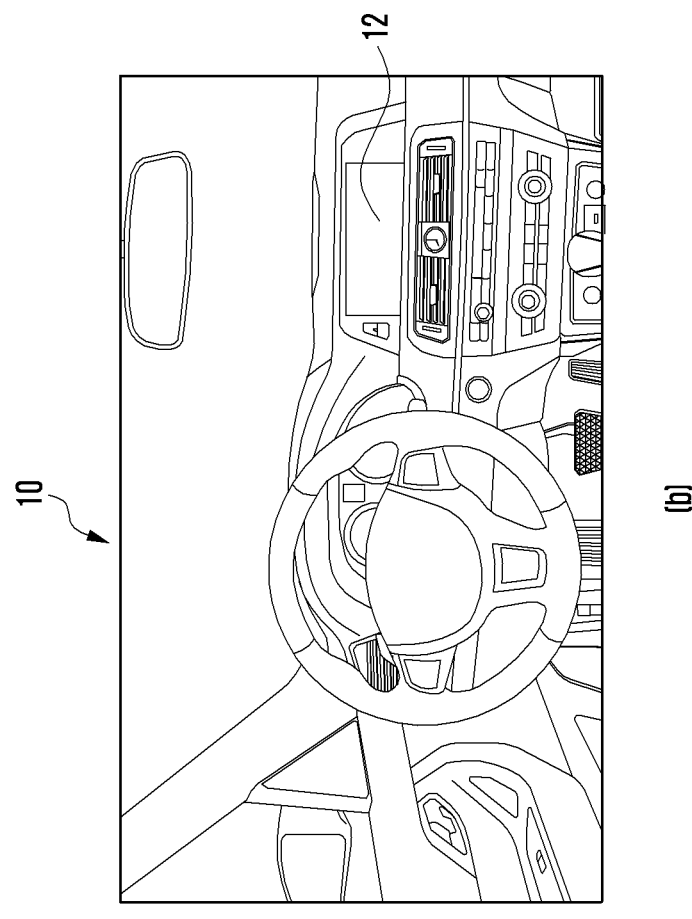
FIG. 1A is a diagram for illustrating the situation in which data for the surrounding situation of a vehicle is collected using various sensors included in a transport apparatus and is incorporated into a vehicle operation.
Figure 1A:
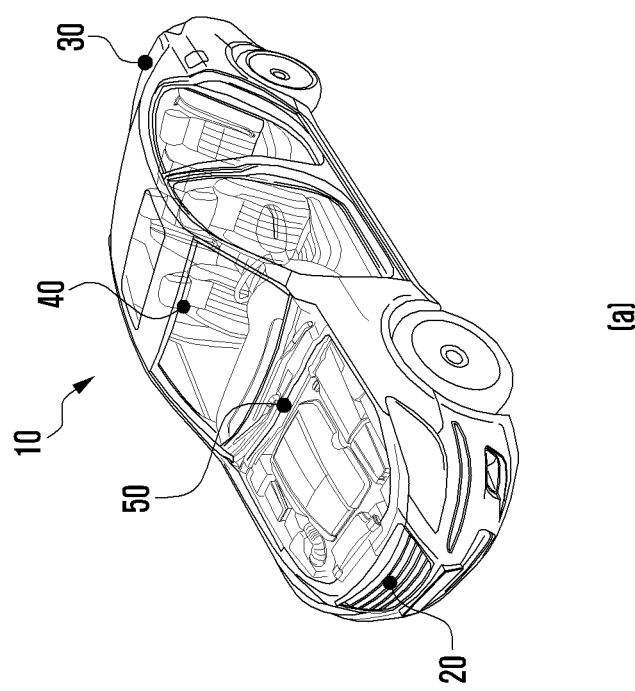

Hereinafter, exemplary embodiments of the disclosure are described in detail with reference to the accompanying drawings. While the disclosure may be embodied in many different forms, specific embodiments of the disclosure are shown in drawings and are described herein in detail, with the understanding that the disclosure is to be considered as an exemplification of the principles of the invention and is not intended to limit the invention to the specific embodiments illustrated. The same reference numbers are used throughout the drawings to refer to the same or like parts. In the disclosure, an expression "or" includes any combination or the entire combination of together listed words. For example, "A or B" may include A, B, or A and B. An expression of a first and a second in the disclosure may represent various elements of the disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the disclosure, and similarly, a second constituent element may be referred to as a first constituent element. When it is described that an element is "coupled" to another element, the element may be "directly coupled" to the other element or "electrically coupled" to the other element through a third element. However, when it is described that an element is "directly coupled" to another element, no element may exist between the element and the other element.

In this document, "configured (or set) to ~" may be interchangeably used with "suitable for ~" in hardware or software, "having the capacity to ~", "adapted to ~", "made to ~", "capable of ~" or "designed to ~" according to circumstances. In some circumstances, an expression "device configured to ~" may mean that the device "may perform ~" along with other devices or parts. For example, a phrase "processor configured (or set) to perform A, B and C" may mean a dedicated processor (e.g., an embedded processor) for performing a corresponding operation or a generic-purpose processor (e.g., a CPU or an application processor) capable of performing corresponding operations by executing one or more software programs stored in a memory device.

An electronic device according to various embodiments of this document may include at least one of a smart phone, a tablet PC, a mobile phone, a video phone, an e-book reader, a desktop PC, a laptop PC, a netbook computer, a workstation, a server, a PDA, a portable multimedia player (PMP), an MP3 player, a medical device, a camera, or a wearable device. The wearable device may include at least one of an accessory type (e.g., a watch, a ring, a bracelet, an ankle bracelet, a necklace, glasses, a contact lens or a head-mounted-device (HMD)), a fabric or clothing-integrated type (e.g., electronic clothing), a body-attached type (e.g., a skin pad or tattoo) or a bio-transplant type. In some embodiments, the electronic device may include at least one of television, a digital video disk (DVD) player, an audio, a set-top box, a home automation control panel, a security control panel, a media box (e.g., Samsung HomeSync™, Apple TV™ or Google TV™), a game console (e.g., Xbox™, PlayStation™), an electronic dictionary, an electronic key, a camcorder or an electronic picture frame, for example.

In another embodiment, the electronic device may include at least one of a navigation device, a satellite navigation system (global navigation satellite system (GNSS)), an event data recorder (EDR), a flight data recorder (FDR), a vehicle infotainment device, electronic equipment for ship (e.g., a navigator for ship and a gyro compass), avionics, security devices, a head unit for vehicle, industry or home robots, a drone or Internet of things. In various embodiments, the electronic device may be flexible or may be a combination of two or more of the various devices. The electronic device according to an embodiment of this document is not limited to the above-described devices. In this document, a term "user" may refer to a person who uses the electronic device or a device (e.g., an artificial intelligence electronic device) that uses the electronic device.

(a) of FIG. 1A and (b) of FIG. 1A are diagrams for illustrating the situation in which is data for the surrounding situation of a vehicle is collected using various sensors included in the vehicle and incorporated into a vehicle operation.

Referring to FIG. 1A, a transport apparatus 10 may provide safety and convenience to a driver who drives the transport apparatus 10 or a passenger using various sensors. The transport apparatus 10 may control the driving of the transport apparatus 10 based on information collected from various sensors using a processor included in the transport apparatus 10 or electrically connected to the transport apparatus 10, or may display driving guidance information to a user using at least one display or notification sensor included in the transport apparatus 10. Such a function may be called a driving assistance system (e.g., an advanced driver assistance system (ADAS)).

In order for the diving assistance system to perform a proper operation based on the condition of the transport apparatus 10, various sensors capable of recognizing the inside or outside state of the transport apparatus 10 may be necessary. A sensor for the driving assistance system may be various depending on its role in the transport apparatus 10, but may approximately include radio detection and ranging (RADAR), light amplification by the stimulated of radiation (LASER), ultrasonic waves, a camera module, and an acceleration/angular speed/steering angle sensor.

A radar sensor 20 may obtain driving information, such as the distance, height, direction, and speed, by analyzing a signal reflected after an electromagnetic wave is radiated toward an object, for example. The transport apparatus 10 may perform functions, such as automatic driving control, front/rear collision warning, blind spot detection, and automatic emergency braking, using the radar sensor 20.

The radar sensor 20 may maintain its detection ability regardless of a driving environment (e.g., rain driving, night driving), and may recognize an object at the distance of about 200 m, for example.

The laser sensor may emit a photon, that is, a particle of light, in a frequency of a narrow band. The laser sensor may obtain surrounding information by analyzing light reflected from an object after it emits ultraviolet rays or infrared rays (infrared), for example.

The laser sensor may maintain its detection ability even at night driving, but has a disadvantage of a short recognition distance.

An ultrasonic sensor 30 may calculate the distance from an object by measuring the time that a sound wave of a high frequency (e.g., 20 kHz), for example, is taken to be returned after the sound wave is reflected by an object. The sound wave is not faster in speed than light, and thus may be chiefly used when the transport apparatus 10 is parked or when the distance from a surrounding object is measured while the transport apparatus moves at a low speed.

A camera module 40 has different resolution, precision, etc. of a captured image depending on a photographing environment, but has an advantage in that it can recognize a shape of an object. Accordingly, the camera module 40 may be used for functions, such as lane detection, rear-end collision prevention, and full beam control, in the transport apparatus 10.

The above-described sensors may be basically sensors for recognizing a surrounding environment outside the transport apparatus 10. In order to increase the accuracy and utilization of a driving assistance system, a sensor for detecting a motion state of the transport apparatus 10 itself is also important. The transport apparatus 10 may be capable of measures, such as braking and steering, based on the results of detection of a sensor only when a motion state of the transport apparatus 10 itself is detected.

A sensor 50 for detecting a motion state of the transport apparatus may include an acceleration sensor, an angular velocity sensor, and a steering angle sensor, for example.

The acceleration sensor may instantaneously detect a dynamic force, such as an acceleration force, vibration or an impact that acts on an object. The acceleration sensor may detect the shaking, direction, etc. of an object. Accordingly, if the acceleration sensor is used, the transport apparatus 10 may detect a movement between specific points. If the angular velocity sensor is used, the rotation of the transport apparatus 10 may also be detected. The steering angle sensor may obtain the angle of a steering wheel included in the transport apparatus 10. The transport apparatus 10 may use the sensors related to the motion state for driving posture control and an airbag operation.

(b) of FIG. 1A shows a form seen in a divers view within the transport apparatus 10 when the driver drives the transport apparatus 10. The driver may view a situation outside the transport apparatus 10 through the windshield glass of the transport apparatus 10, for example, and may also view a steering wheel for driving, a cluster screen, and other manipulation devices. The transport apparatus 10 may display driving guidance information, generated using the above-described various sensors, on a display 12. Furthermore, if the transport apparatus 10 includes a head up display (HUD), the transport apparatus may display driving guidance information on the HUD.

The transport apparatus 10 may check the lane in which the transport apparatus is driving and the presence or absence of another vehicle positioned in the driving lane using an image received through the camera module 40, and may display the lane or another vehicle on the display 10, if necessary. Accordingly, a driver can drive the transport apparatus 10, while watching driving guidance information generated by the transport apparatus.

Furthermore, the transport apparatus 10 may control the driving of the transport apparatus 10 using driving-related information generated using various sensors. For example, the transport apparatus 10 may reduce the speed of the transport apparatus 10 based on the distance from a vehicle ahead. If the transport apparatus 10 deviates from a driving lane without a separate signal, it may generate and output an alarm.

Figure 1B:
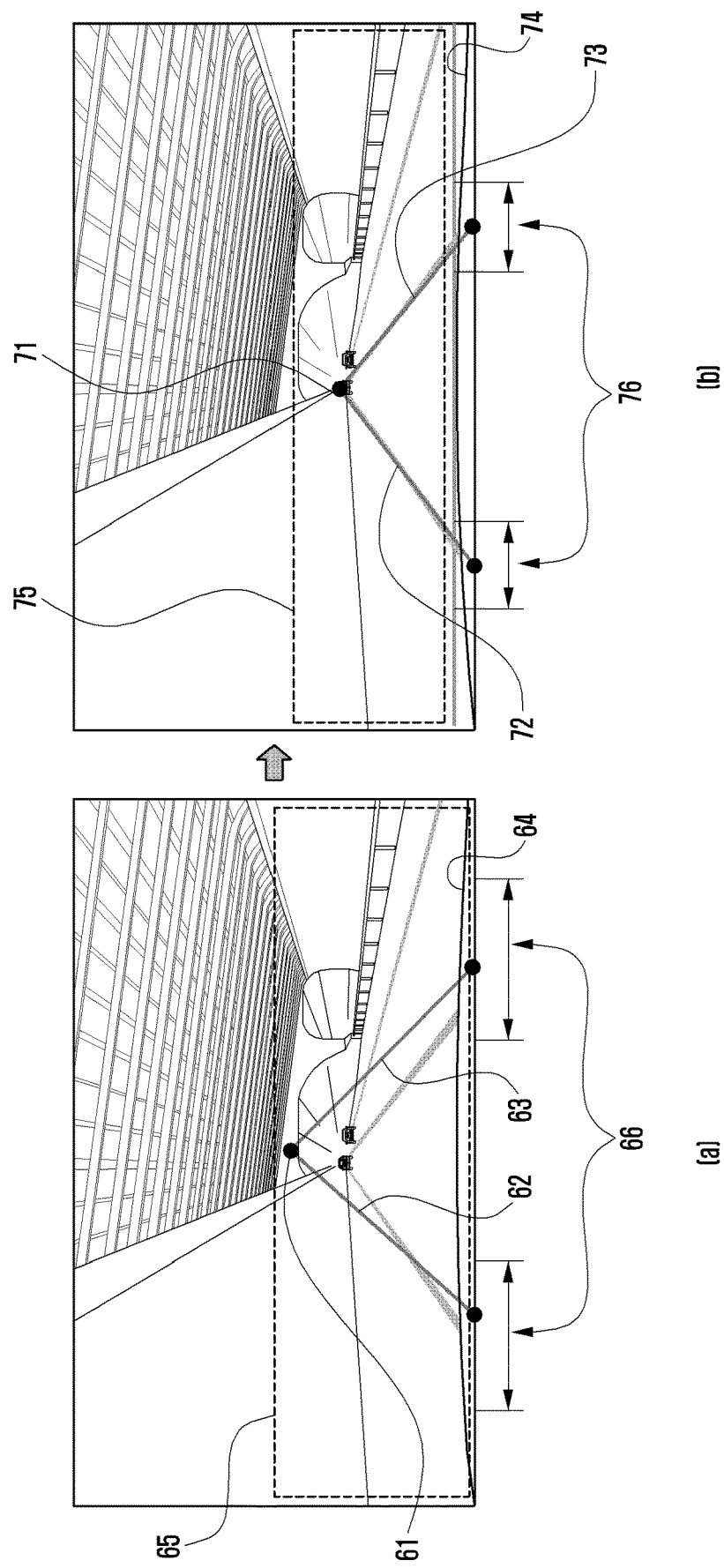
FIG. 1B shows diagrams in which a transport apparatus according to an embodiment detects the lane in which the transport apparatus is driving based on an image received through a camera module, that is, one of functions included in a driving assistance system.

FIG. 1B is a diagram in which a transport apparatus according to an embodiment detects the lane in which the transport apparatus is driving based on an image received through a camera module (e.g., the camera module 40 of FIG. 1A), that is, one of functions included in a driving assistance system.

Referring to (a) of FIG. 1B, the transport apparatus 10 may detect the lane in which the transport apparatus 10 is driving based on an image received through a camera module (e.g., the camera module 40 of FIG. 1A) included in the transport apparatus 10.

For example, the transport apparatus 10 may previously set a reference vanishing point 61, a straight line 62 corresponding to a left lane, a straight line 63 corresponding to a right lane, a vehicle hood 64, a valid lane width range 66, and a vehicle and lane detection area 65.

The transport apparatus 10 according to an embodiment may perform lane detection on an image, received through a camera module (e.g., the camera module 40 of FIG. 1A), in the preset vehicle and lane detection area 65. Specifically, the transport apparatus 10 may receive a preset frame (e.g., 300 frames), and may detect an edge area in the received image. Particularly, the transport apparatus 10 may detect edges in areas adjacent the preset reference vanishing point 61, the straight line 62 corresponding to the left lane, the straight line 63 corresponding to the right lane, and the vehicle hood 64, and may correct the locations of the reference vanishing point 61, the straight line 62 corresponding to the left lane, the straight line 63 corresponding to the right lane, and the vehicle hood 64.

Referring to (b) of FIG. 1B, the transport apparatus 10 may change a lane and vehicle detection area 75, a valid lane width range 76, etc. based on the locations of a changed reference vanishing point 71, straight line 72 corresponding to the left lane, a straight line 73 corresponding to the right lane, and a vehicle hood 74.

As described above, the transport apparatus 10 may detect a driving lane using a camera module (e.g., the camera module 40 of FIG. 1A) mounted on the transport apparatus 10, and may use the detected lane for a driving assistance system. According to an embodiment, the transport apparatus 10 may detect a driving lane using a separate electronic device.

Figure 1C:
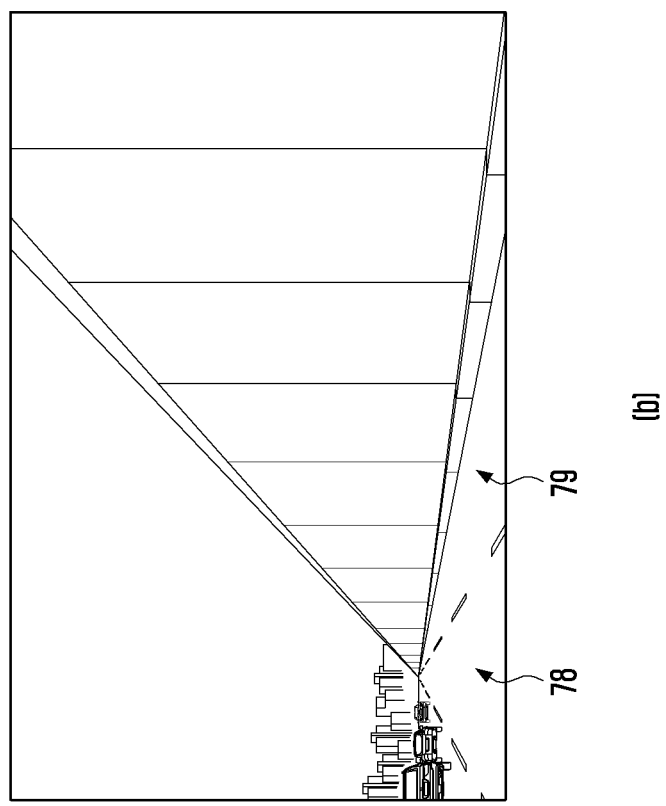
FIG. 1C illustrates the case where the direction toward which the camera module of an electronic device according to an embodiment is not identical with the direction in which a transport apparatus drives.
Figure 1C:
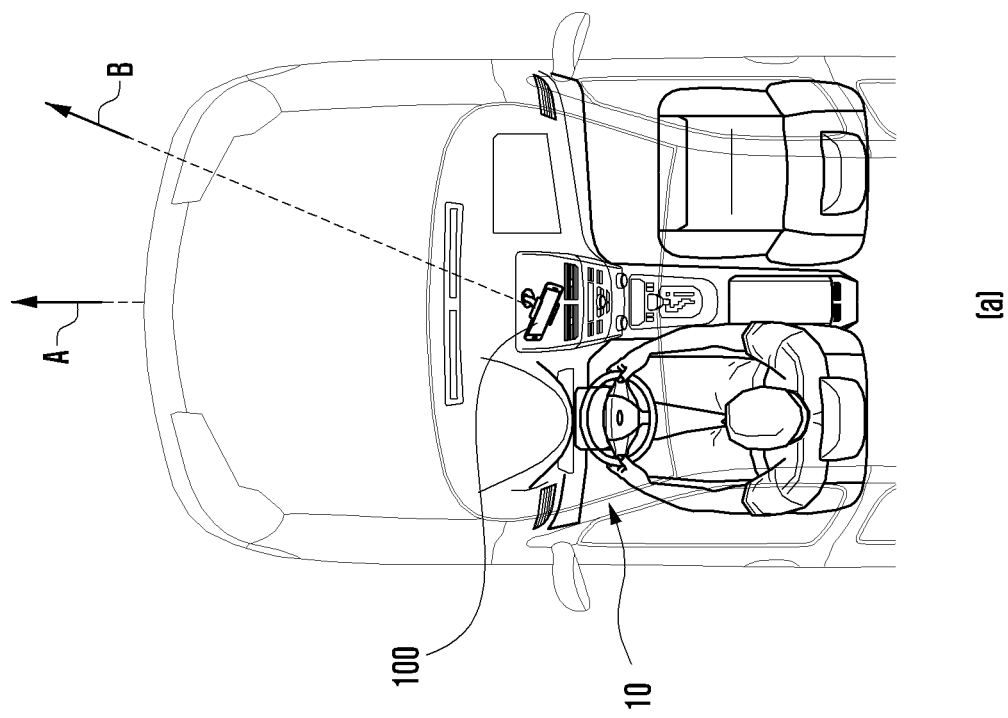

Referring to (a) of FIG. 1C, a user may put an electronic device 100, such as a smartphone, on the transport apparatus 10, may detect a lane based on an image generated through a camera module (not shown) included in the electronic device 100, and may use the detected lane for a diving assistance system. For example, the electronic device 100 may detect a lane based on the execution of an application for performing a driving assistance system function. In this case, the electronic device 100 and the transport apparatus 10 may communicate with each other using a wired or wireless communication method.

Wireless communication may include cellular communication using at least one of LTE, LTE advance (LTE-A), code division multiple access (CDMA), wideband CDMA (WCDMA), a universal mobile telecommunications system (UMTS), a wireless broadband (WiBro), or global system for mobile communications (GSM), for example. According to an embodiment, wireless communication may include at least one of wireless fidelity (WiFi), Bluetooth, Bluetooth low energy (BLE), Zigbee, near field communication (NFC), magnetic secure transmission, a radio frequency (RF), or a body area network (BAN), for example.

According to an embodiment, wireless communication may include a GNSS. The GNSS may be a global positioning system (GPS), a global navigation satellite system (Glonass), a Beidou navigation satellite system (hereinafter referred to as "Beidou"), Galileo, or the European global satellite-based navigation system, for example. Hereinafter, in this document, the "GPS" and the "GNSS" may be interchangeably used.

Wired communication may include at least one of a universal serial bus (USB), a high definition multimedia interface (HDMI), recommended standard 232 (RS-232), power line communication, or plain old telephone service (POTS), for example. A network may include at least one of telecommunication networks, for example, a computer network (e.g., LAN or WAN), Internet, or a telephone network.

Referring to (a) of FIG. 1C, if a user puts the electronic device 100 on the transport apparatus 10, the electronic device 100 may not be positioned at the central part of the transport apparatus 10. Furthermore, the direction A in which the transport apparatus 10 is diving and the direction B toward which a camera module included in the electronic device 100 is directed may not be the same. In this case, a lane detected by the electronic device 100 may not be the lane in which the transport apparatus 10 is driving.

(b) of FIG. 1C shows an image which is obtained through a camera module included in the electronic device 100 and displayed on the display of the electronic device 100 or which is displayed on a display (not shown) included in the transport apparatus 10 through wired or wireless communication. The electronic device 100 may detect the lane in which the transport apparatus 10 is driving using a method identical with or similar to the method described in FIG. 1B. For example, the electronic device 100 may detect a first lane 78 and a second lane 79 in the input image.

According to an embodiment, the electronic device 100 may recognize the second lane 79 that belongs to the detected lane and that is positioned at the center of the image as the lane in which the transport apparatus 10 is driving. Accordingly, the electronic device 100 needs to change a criterion for selecting a lane that belongs to detected lanes and in which the transport apparatus 10 on which the electronic device 100 is put is driving.

Figure 1D:
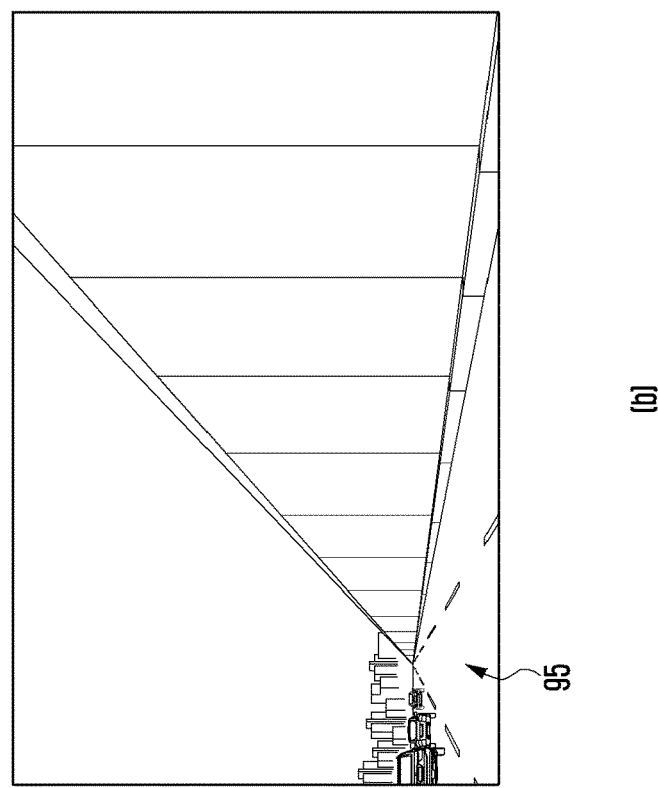
FIG. 1D is a diagram for illustrating the situation in which an electronic device according to an embodiment detects the lane in which a transport apparatus on which the electronic device is put is driving by analyzing an input image.
Figure 1D:
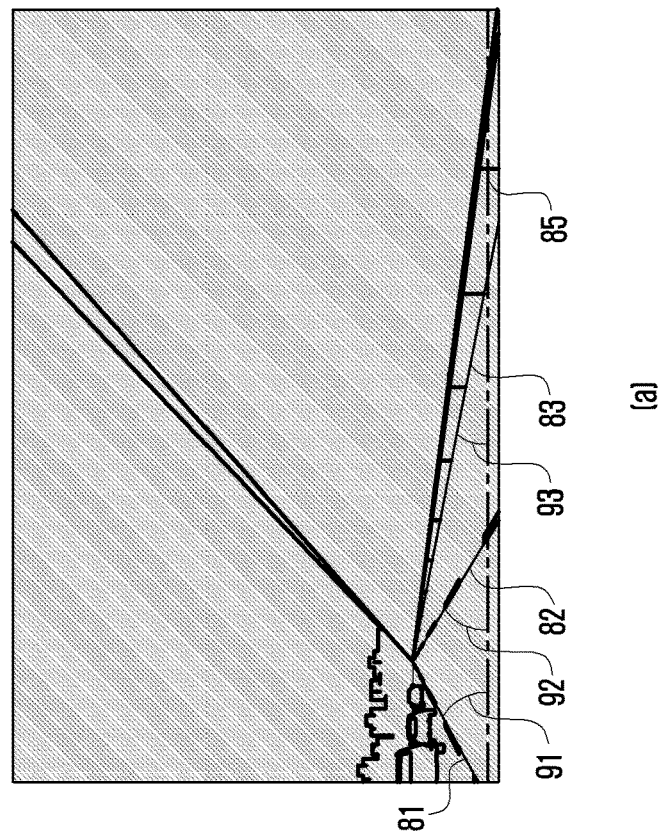

FIG. 1D show diagrams for illustrating the situation in which the electronic device 100 according to an embodiment detects the lane in which the transport apparatus 10 on which the electronic device 100 is put is driving by analyzing an input image.

Referring to (a) of FIG. 1D, the electronic device 100 may convert an input image into an image that highlights an edge component. A detailed process of converting an input image into an image that highlights an edge is described later with reference to FIG. 3.

The electronic device 100 according to an embodiment may calculate angles formed by straight lines 81, 82, and 83, detected in a preset vehicle and lane detection area (e.g., the vehicle and lane detection area 65 of FIG. 1B), and a virtual horizontal line 85. For example, the electronic device 100 may calculate a first angle 91 formed by the first straight line 81 and the virtual horizontal line 85. Furthermore, the electronic device 100 may calculate a second angle 92 formed by the second straight line 82 and the virtual horizontal line 85. Furthermore, the electronic device 100 may calculate may calculate a third angle 93 formed by the third straight line 83 and the virtual horizontal line 85. The electronic device 100 may select two straight lines based on the calculated angles.

For example, the electronic device 100 may extract two angles, having a preset value or less in the difference between their absolute values, from the calculated angles 91, 92, and 93 in order of greater absolute value, and may select the virtual horizontal line and two straight lines forming the extracted two angles.

Specifically, the electronic device 100 may extract the first angle 91 and the second angle 92 that belong to the first angle 91, the second angle 92, and the third angle 93 and that have a preset value or less in the difference between their absolute values in order of greater absolute value. Further-more, the electronic device 100 may select the virtual horizontal line 85, and the first straight line 81 and the second straight line 82 that form the first angle 91 and the second angle 92. If a difference between absolute values is a preset value or less, this may mean that a difference between the absolute values is about 5 degrees to 10 degrees, for example, but the disclosure is not limited thereto.

Referring to (b) of FIG. 1D, the electronic device 100 may select the lane 95, including the selected two straight lines, as the lane in which the transport apparatus 10 on which the electronic device 100 is put is diving.

As described above, the electronic device 100 according to an embodiment may establish communication with the transport apparatus 10 using wired or wireless communication, and may provide some of the functions of a driving assistance system. Particularly, the electronic device 100 according to an embodiment may detect the lane in which the transport apparatus 10 is driving although the direction of a camera module included in the electronic device 100 is not identical with the direction in which the transport apparatus 10 is driving.

Figure 2:
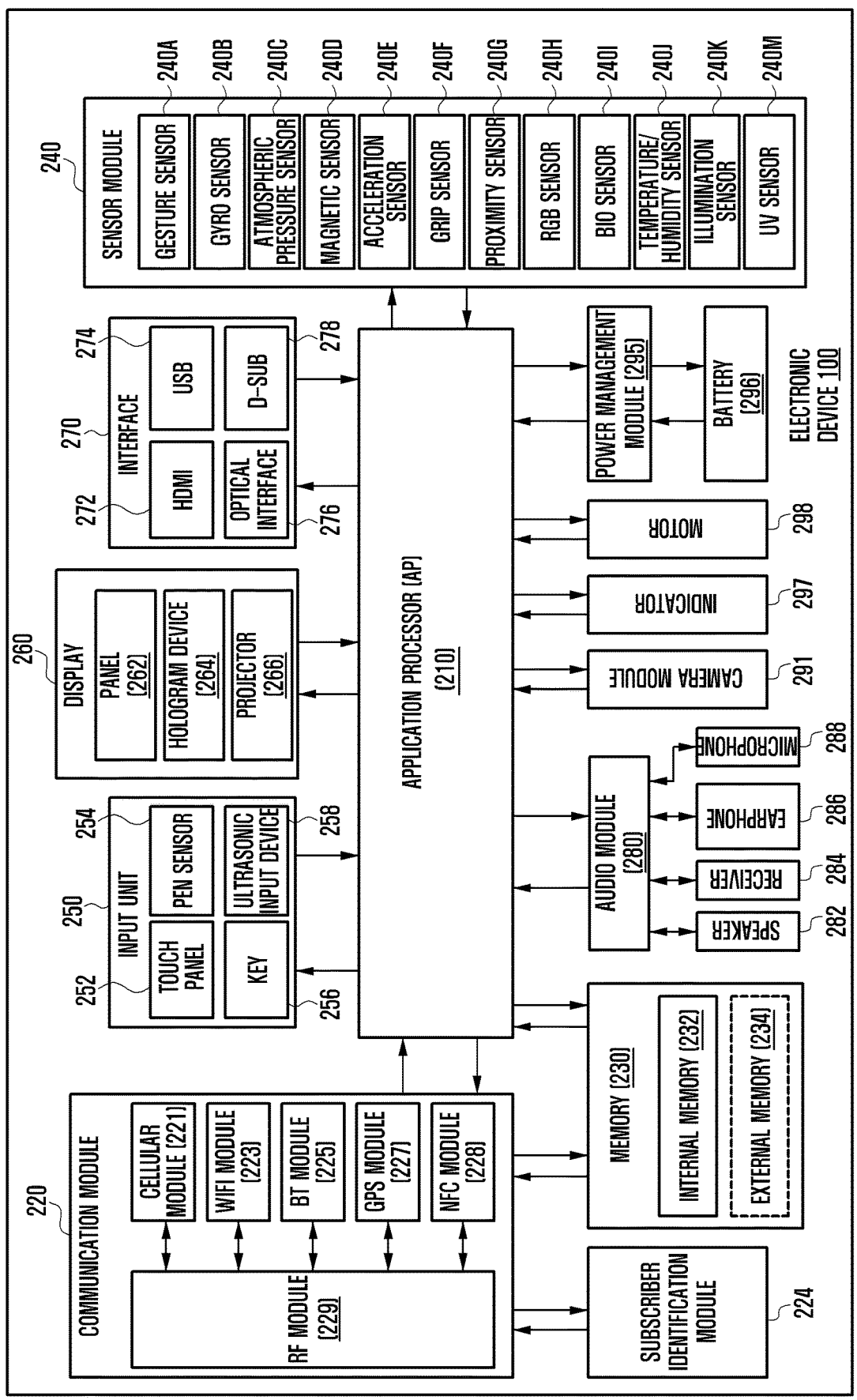
FIG. 2 is a block diagram of an electronic device according to various embodiments.

FIG. 2 is a block diagram illustrating an example electronic device 201 in accordance with an example embodiment of the disclosure. The electronic device 201 may include at least one application processor (AP) (e.g., including processing circuitry) 210, a communication module (e.g., including communication circuitry) 220, a subscriber identification module (SIM) card 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298. The application processor 210 may control a plurality of hardware or software components connected thereto by driving an operating system or applications, for example, and may perform various types of data processing and operation. The application processor 210 may be formed of system-on-chip (SoC), for example. According to an embodiment, the application processor 210 may further include a graphic processing unit (GPU) and/or an image processor. The application processor 210 may include at least one (e.g., cellular module 221) of the elements shown in FIG. 2. The processor 210 may load instructions or data, received from at least one of other elements (e.g., nonvolatile memory), into a volatile memory, may process the instructions or data, and may store resulting data in a nonvolatile memory.

The communication module 220 may include a cellular module 221, a WiFi module 223, a Bluetooth module 225, a GNSS module 227, an NFC module 228, and an RF module 229. The cellular module 221 may provide a voice call, a video call, text services or Internet service. According to an embodiment, the cellular module 221 may perform the identification and authentication of the electronic device in a communication network using a subscriber identity module (e.g., SIM card 224). According to an embodiment, the cellular module 221 may perform at least some of functions that may be provided by the AP 210. According to an embodiment, the cellular module 221 may include a communication processor (CP). According to an embodiment, at least some (e.g., two or more) of the cellular module 221, the WiFi module 223, the Bluetooth module 225, the GNSS module 227 or the NFC module 228 may be included in a single integrated circuit (IC) chip or a single IC package. The RF module 229 may transmit and receive data communication signals (e.g., RF signals), for example. The RF module 229 may include a transceiver, a power amp module (PAM), a frequency filter, a low noise amplifier (LNA) or an antenna. According to another embodiment, at least one of the cellular module 221, the WiFi module 223, the Bluetooth module 225, the GNSS module 227 or the NFC module 228 may transmit and receive RF signals through a separate RF module. The subscriber identity module 224 may include a card including a subscriber identity module or an embedded SIM, and may include unique identity information (e.g., integrated circuit card identifier (ICCID) or subscriber information (e.g., international mobile subscriber identity (IMSI).

The memory 230 may include an internal memory 232 or an external memory 234. The internal memory 232 may include least one of a volatile memory (e.g., DRAM, SRAM or SDRAM), a nonvolatile memory (e.g., one time programmable ROM (OTPROM), PROM, EPROM, EEPROM, mask ROM, flash ROM, NAND flash memory, a hard drive, or a solid state drive (SSD), for example. The external memory 234 may include a flash drive, for example, a compact flash (CF), secure digital (SD), micro-SD, mini-SD, extreme digital (xD), a multi-media card (MMC) or a memory stick. The external memory 234 may be connected to the electronic device 100 functionally or physically through various interfaces.

The sensor module 240 may measure physical quantity or detect the operating status of the electronic device 100, and may convert measured or sensed information into electric signals. The sensor module 240 may include at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., red, green, blue (RGB) sensor), a biometric sensor 240I, a temperature/humidity sensor 240J, an illumination sensor 240K, or a ultraviolet (UV) sensor 240M, for example. Additionally or alternatively, the sensor module 240 may include an e-nose sensor, an electromyography (EMG) sensor, an electroencephalogram (EEG) sensor, an electrocardiogram (ECG) sensor, an infrared (IR) sensor, an iris scan sensor and/or a finger scan sensor, for example. Furthermore, the sensor module 240 may further include a control circuit for controlling one or more sensors included therein. In an embodiment, the electronic device 100 may further include a processor configured to control the sensor module 240 as part of the processor 210 or separately, and may control the sensor module 240 while the processor 210 is in a sleep state.

The input device 250 may include a touch panel 252, a (digital) pen sensor 254, a key 256 or an ultrasonic input unit 258, for example. The touch panel 252 may use at least one of a capacitive type, resistive type, infrared type, or ultrasonic type, for example. Furthermore, the touch panel 252 may further include a control circuit. The touch panel 252 may further include a tactile layer, and may provide a tactile response to a user. The (digital) pen sensor 254 may be part of the touch panel or may include a separate sheet for recognition. The key 256 may include a physical button, an optical key, or a keypad, for example. The ultrasonic input unit 258 may identify data corresponding to ultrasonic waves by detecting ultrasonic waves, generated from an input tool, through a microphone 288.

The display 260 may include a panel 262, a hologram 264, a projector 266 and/or a control circuit for controlling them. The panel 262 may be implemented in such a way as to be flexible, transparent or wearable. The panel 262 may be configured with a touch panel 252 and one or more modules. According to one embodiment, the panel 262 may include a pressure sensor (or force sensor) capable of measuring the intensity of pressure on a users touch. The pressure sensor may be integrated with the touch panel 252 or may be implemented as a sensor separated from the touch panel 252. The hologram 264 may show a stereoscopic image in the air using interference of light. The projector 266 may display an image by projecting light onto a screen. The screen may be positioned inside or outside the electronic device 100. The interface 270 may include an HDMI 272, a USB 274, an optical interface 276 or a D-subminiature (D-sub) 278. Additionally or alternatively, the interface 270 may include, for example, a mobile high-definition link (MHL) interface, a secure digital (SD) card/multi-media card (MMC) interface, or an infrared data association (IrDA) interface.

The audio module 280 may convert sound and electric signals and vice versa. The audio module 280 may process sound information input or output through a speaker 282, a receiver 284, an earphone 286, or a microphone 288. The camera module 291 is a device capable of obtaining still images and moving images. According to an embodiment, the camera module may include at least one image sensor (e.g., a front sensor or a rear sensor), a lens, an image signal processor (ISP), or a flash (e.g., LED or xenon lamp). The power management module 295 may manage power of the electronic device 100. According to an embodiment, the power management module 295 may include a power management integrated circuit (PMIC), a charger IC, or a battery or fuel gauge, for example. The PMIC may have a wired and/or wireless charging method. The wireless charging method may include a magnetic resonance type, a magnetic induction type, or an electromagnetic type, for example, and may include additional circuits for wireless charging, for example, a coil loop, a resonance circuit, or a rectifier. The battery gauge may measure the residual amount of the battery 296 and a voltage, current or temperature during charging. The battery 296 may include a rechargeable battery and/or a solar battery, for example.

The indicator 297 may display a given status (e.g., a booting status, a message status, or a charging status) of the electronic device 100 or a part thereof (e.g., the AP 210). The motor 298 may convert an electric signal into mechanical vibration, and may generate vibration or a haptic effect. The electronic device 100 may include a mobile TV support device (e.g., GPU) capable of processing media data according to the standards of digital multimedia broadcasting (DMB), digital video broadcasting (DVB) or mediaFlo™. Each of the elements described in this document may be configured with one or more components, and the name of a corresponding component may be different depending on the type of electronic device. In various embodiments, an electronic device (e.g., the electronic device 100) may omit some of the components or may further include an additional component or some of the components may be combined into a single entity, which may perform the same function as those of the component prior to the combination.

Figure 3:
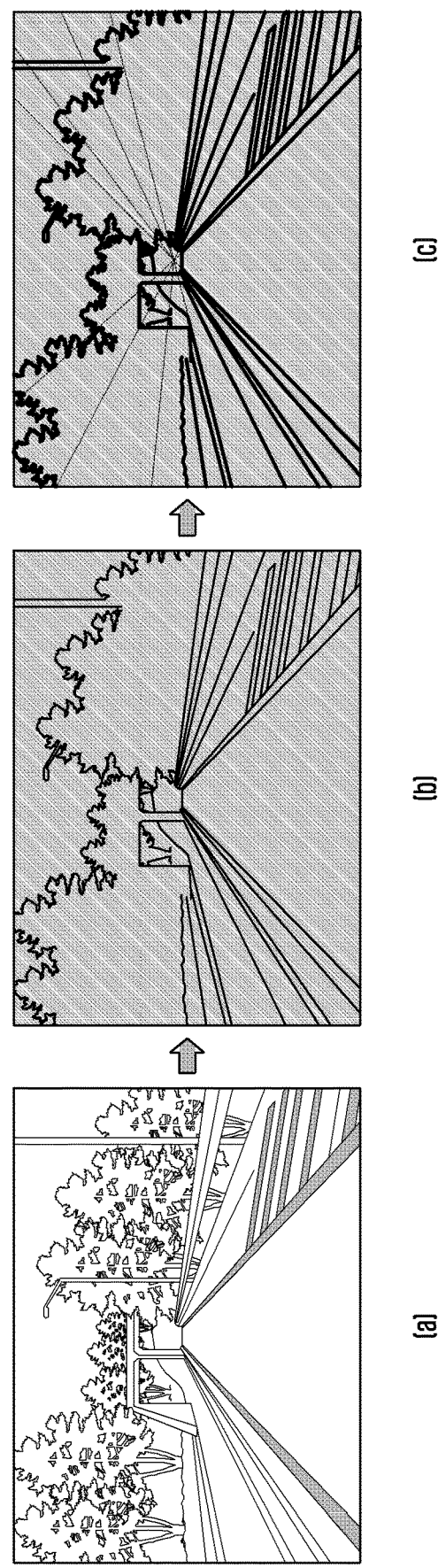
FIG. 3 shows diagrams for illustrating the situation in which the electronic device according to an embodiment detects a straight line component in an input image.

FIG. 3 shows diagrams for illustrating the situation in which the electronic device according to an embodiment changes an input image into an image that highlights an edge in order to detect a straight line component in the input image.

The electronic device 100 according to an embodiment may analyze an input image through a camera module (not shown) included in the electronic device 100 in order to detect the lane in which a transport apparatus (e.g., the transport apparatus 10 of FIG. 1A) on which the electronic device 100 is put is driving.

Referring to (a) of FIG. 3 and (b) of FIG. 3, the electronic device 100 may perform a gray scale on an input image through the camera module. The gray scale may mean that a generated color image is converted into an image having white to black of 10 steps, for example. That is, the electronic device 100 may convert a color image into an image having only a brightness value without color information.

The electronic device 100 according to an embodiment may detect an edge using Sobel operation having high efficiency in edge detection of a diagonal direction in order to extract a lane from an image, but the disclosure is not limited thereto. A method of calculating a slope in an image and a method using a mask, that is, detection methods based on the calculation of a partial differentiation operator, may be used as a method for the electronic device 100 to detect an edge using Sobel operation.

Referring to (b) of FIG. 3 and (c) of FIG. 3, the electronic device 100 may perform a binarization task on an edge component, extracted by Sobel operation, in order to remove noise included in the image. The binarization task is operation of changing a pixel value of an image into 0 or 255, for example, and may be a task for dividing the attributes of a pixel into two groups of a background and an object. The electronic device 100 may obtain information of a given object (e.g., the location, size, and shape of an object) within the image using the binarization task.

According to an embodiment, the electronic device 100 may perform Hough transformation on the image from which noise has been removed in order to find out a straight line for lane detection. The boundary line of an object can be found out through the Hough transformation although there is no prior knowledge on the object included in an image. Accordingly, as in (C) of FIG. 3, the electronic device 100 may add up pixel values of a plurality of straight line candidates included in an image using Hough transformation, may detect a maximum value of the pixel values, and may detect one straight line.

An algorithm used in the above-described image transform is merely an embodiment, and may be substituted with another algorithm depending on the characteristics of an image and the characteristics of a processor.

According to an embodiment, the electronic device 100 may perform the process on multiple image frames configuring an image that is received through a camera module and generated. For example, if the camera module of the electronic device 100 generates an image of 30 frames per second, the image processing process may be performed on each of the generated 30 frames, but the disclosure is not limited thereto.

The electronic device 100 may obtain an image, such as (a) of FIG. 1D and may obtain angles formed by a detected straight line component and a virtual horizontal line (e.g., the horizontal line 85 of FIG. 1D) through the above step.

Figure 4:
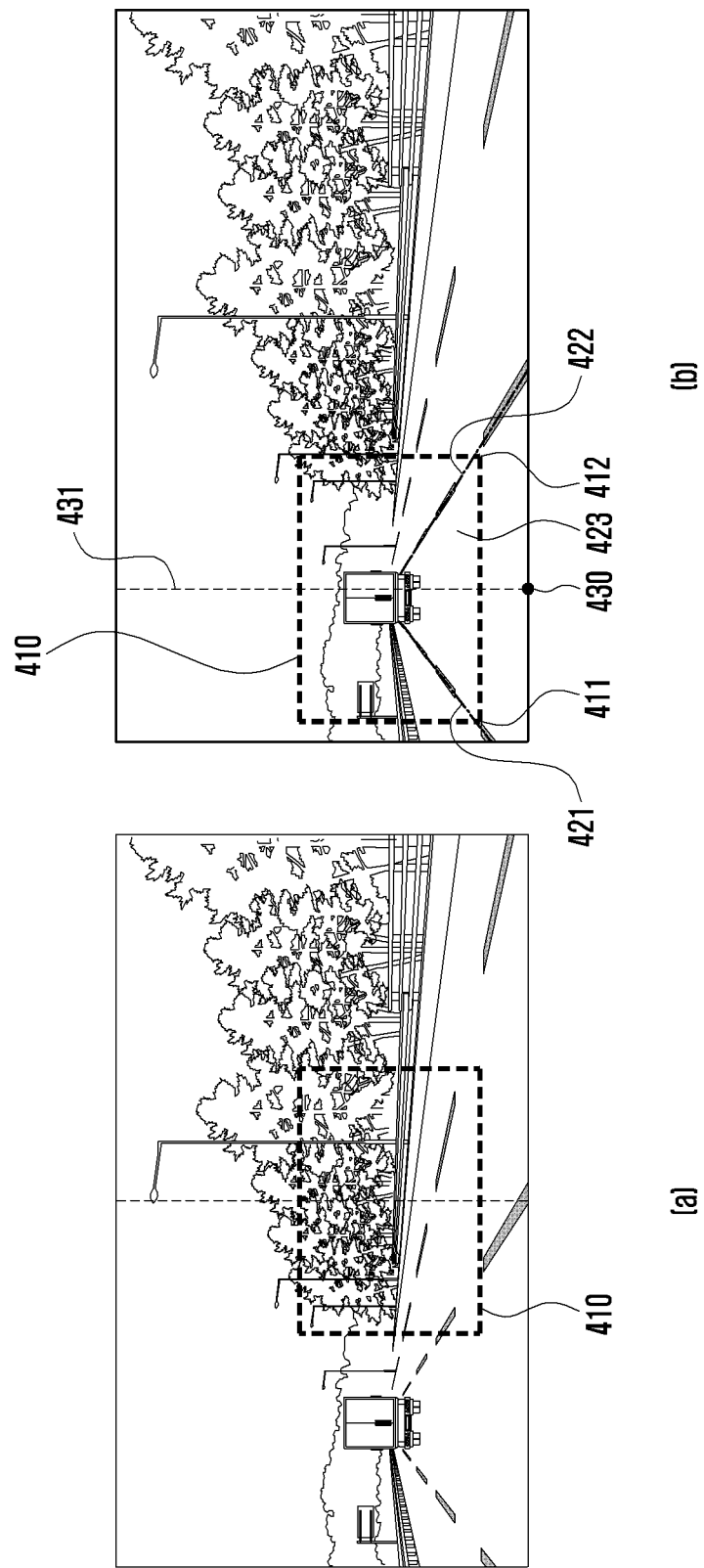
FIG. 4 shows diagrams for illustrating the situation in which the electronic device according to an embodiment detects the lane in which a transport apparatus is driving in an input image and changes an area for vehicle detection.

FIG. 4 shows diagrams for illustrating the situation in which an electronic device according to an embodiment detects the lane in which a transport apparatus is driving in an input image and then changes an area for vehicle detection.

Referring to (a) of FIG. 4, the electronic device 100 may set an object detection area 410 for detecting a vehicle ahead at the central part of an input image. The area for object detection may be displayed at the central part of the input image, for example. The electronic device 100 may detect whether a vehicle is present by analyzing an image of the object detection area 410 for detecting a vehicle ahead. The object detection area 410 for detecting a vehicle ahead may have a square shape, for example. According to an embodiment, the electronic device 100 may detect the presence or absence of a vehicle and transmit a result of the detection to a transport apparatus (e.g., the transport apparatus 10 of FIG. 1A). The transport apparatus (e.g., the transport apparatus 10 of FIG. 1A) may control the driving of the transport apparatus (e.g., the transport apparatus 10 of FIG. 1A) or generate notification for a user by determining the distance from a vehicle ahead detected using the radar sensor described in FIG. 1A.

The electronic device 100 may set the object detection area 410 for detecting a vehicle ahead at the central part, assuming that the direction in which a transport apparatus (e.g., the transport apparatus 10 of FIG. 1A) proceeds and the direction toward which a camera module included in the electronic device 100 is directed are the same. However, if the direction toward which a camera module included in the electronic device 100 is directed and the direction in which a transport apparatus (e.g., the transport apparatus 10 of FIG. 1A) put on the electronic device 100 drives are the same as in (a) of FIG. 10, the object detection area 410 for detecting a vehicle ahead and the lane in which the transport apparatus (e.g., the transport apparatus 10 of FIG. 1A) is driving may not be the same.

Referring to (b) of FIG. 4, the electronic device 100 may detect the lane in which a transport apparatus (e.g., the transport apparatus 10 of FIG. 1A) on which the electronic device 100 is put is driving using the method described in FIG. 1D.

According to an embodiment, the electronic device 100 may set a center point below a first straight line 421 and second straight line 422 determined to be a lane in which a transport apparatus (e.g., the transport apparatus 10 of FIG. 1A) is driving as a drivers lane reference point 430.

According to an embodiment, the electronic device 100 may select a area 423, including the first straight line 421 and the second straight line 422, as the lane in which a transport apparatus (e.g., the transport apparatus 10 of FIG. 1A) is driving. The electronic device 100 may set the center point 430 of the lane in which the transport apparatus 10 is driving. The electronic device 100 may set a vertical line 431 passing through the center point 430, and may set the object detection area 410 so that it is bisected by the vertical line 431 and corners 411 and 412 at the bottom of the object detection area 410 neighbor the first straight line 421 and the second straight line 422, respectively. However, the disclosure is not limited thereto. The electronic device 100 may generate the object detection area 410 having various shapes and sizes.

According to another embodiment, if the electronic device 100 has not set the object detection area 410, it may set a location of the object detection area 410 that has not yet been determined using the above-described method.

Accordingly, the electronic device 100 can detect a transport apparatus in a driving lane with high accuracy although the direction toward which a camera module is directed is not the same as the direction in which a transport apparatus (e.g., the transport apparatus 10 of FIG. 1A) is running. Furthermore, the electronic device 100 may reduce a detection time by detecting an object only in some of an image.

Figure 5:
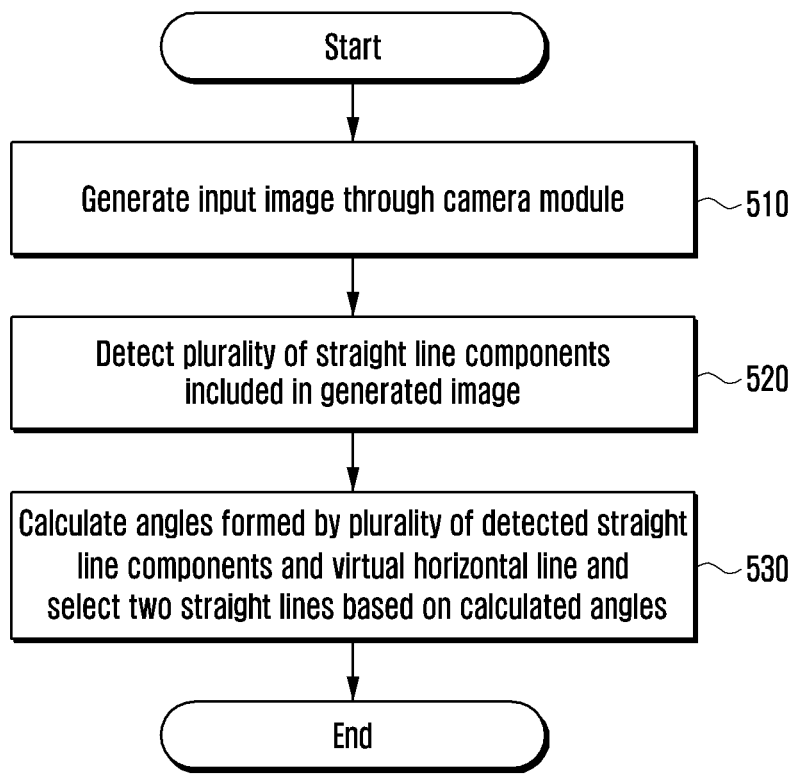
FIG. 5 is a flowchart illustrating a process for the electronic device according to an embodiment to detect a lane in an input image.

FIG. 5 is a flowchart illustrating a process for an electronic device according to an embodiment to detect a lane in an input image.

Referring to operation 510, the electronic device 100 may generate an input image through a camera module. According to an embodiment, the electronic device 100 may include the camera module, and may establish a communication relation with a separate camera module and receive data related to an image from the camera module.

Referring to operation 520, the electronic device 100 may detect a straight line component included in the generated image. The electronic device 100 may detect the straight line component using various image processing methods. For example, the electronic device may detect the straight line component by performing image processing, such as a gray scale task, Sobel operation, a binarization task, or a Hough transformation task, on the input image. However, the task performed by the electronic device 100 in order to detect the straight line component is not limited thereto, and may include various methods depending on the characteristics of an image and the characteristics of an electronic device.

Furthermore, the electronic device 100 may detect a plurality of straight line components in the entire generated image or may detect a straight line component only in a preset area.

Referring to operation 530, the electronic device 100 may calculate angles formed by a plurality of detected straight line components and a virtual horizontal line, and may select two straight lines based on the calculated angles. For example, the electronic device 100 may select two angles, having a preset value or less in a difference between the absolute values of the calculated angles, in order of greater absolute value, and may select the above-described virtual horizontal line and the two straight lines forming the two angles. The electronic device 100 may select a lane, including the selected two straight lines, as the lane in which a transport apparatus on which the electronic device 100 is put is driving.

Figure 6:
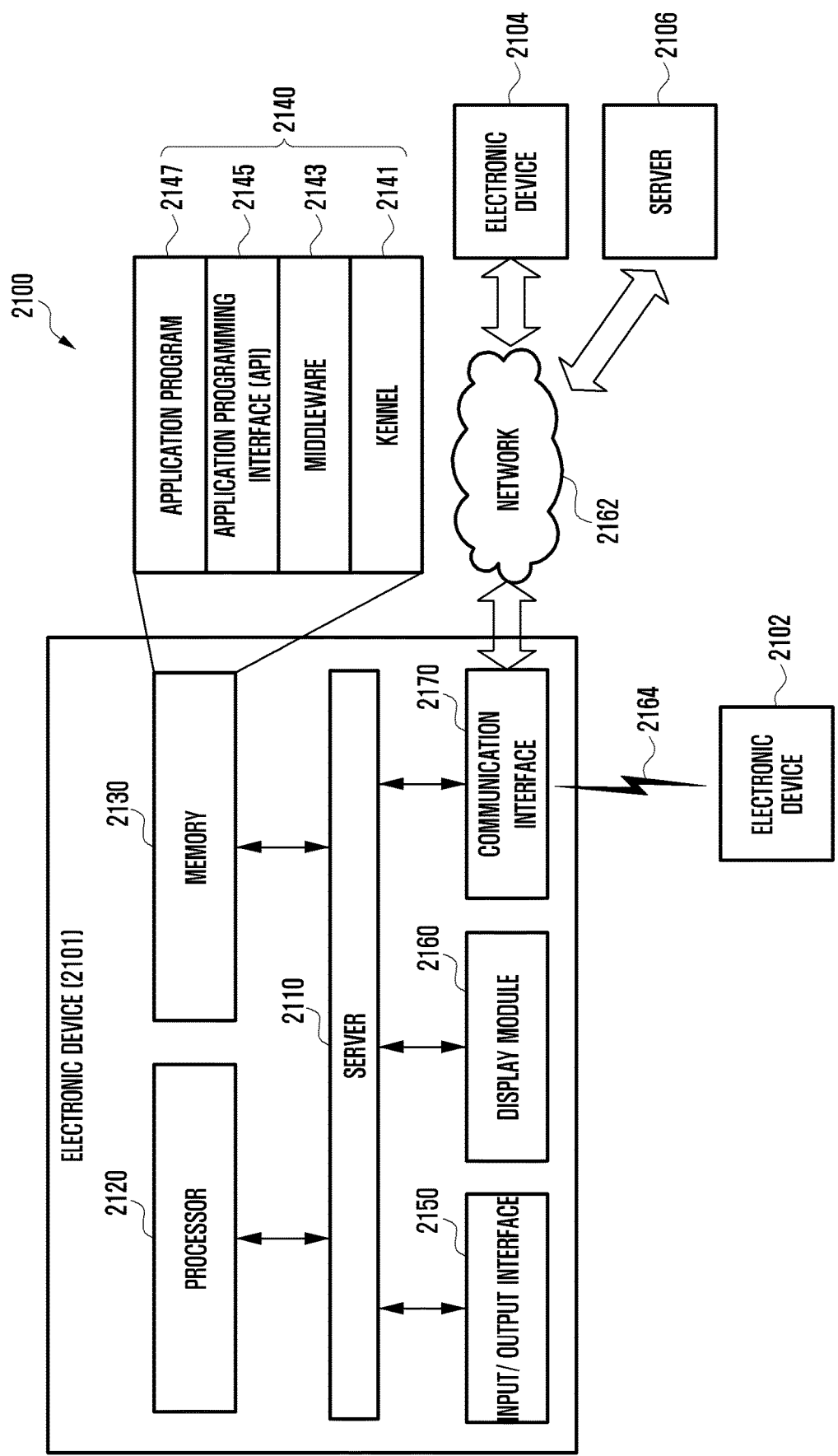
FIG. 6 is a diagram illustrating an electronic device within a network environment according to various embodiments.

Referring to FIG. 6, there is described an electronic device 2101 within a network environment 2100 in various embodiments. The electronic device 2101 may include the electronic device 100 of FIG. 2. The electronic device 2101 may include a bus 2110, a processor 2120, a memory 2130, an input and output interface 2150, a display 2160, and a communication interface 2170. In an embodiment, the electronic device 2101 may omit at least one of the elements or may additionally include another element. The bus 2110 may include a circuit for connecting the elements 2110-2170 and delivering communication (e.g., a control message or data) between the elements. The processor 2120 may include one or more of a central processing unit, an application processor, or a communication processor (CP). The processor 2120 may execute operation or data processing regarding control and/or communication of at least another element of the electronic device 2101, for example.

The memory 2130 may include a volatile memory and/or a nonvolatile memory. The memory 2130 may store instructions or data related to at least one element of the electronic device 2101, for example. According to one embodiment, the memory 2130 may store software and/or a program 2140. The program 2140 may include, for example, a kernel 2141, middleware 2143, an application programming interface (API) 2145 and/or an application program (or "application") 2147. At least some of the kernel 2141, the middleware 2143 or the API 2145 may be called an operating system (OS). The kernel 2141 may control or manage system resources (e.g., the bus 2110, the processor 2120 and the memory 2130) used to execute operations or functions implemented in other programs (e.g., the middleware 2143, the API 2145 or the application program 2147), for example. Furthermore, the kernel 2141 may provide an interface capable of controlling or managing system resources by accessing individual elements of the electronic device 2101 in the middleware 2143, the API 2145 or the application program 2147.

The middleware 2143 may perform a mediation role so that the API 2145 or the application program 2147, for example, can exchange data through communication with the kernel 2141. Furthermore, the middleware 2143 may process one or more task requests received from the application program 2147 based on priority. For example, the middleware 2143 may assign priority on which the system resources (e.g., the bus 2110, the processor 2120 and the memory 2130) of the electronic device 2101 can be used to at least one of the application programs 2147, and may process the one or more task requests. The API 2145 is an interface through which the application 2147 controls a function provided by the kernel 2141 or the middleware 2143, and may include at least one interface or function (e.g., an instruction) for file control, window control, image processing or text control. The input/output interface 2150 may deliver an instruction or data received from a user or another external device to other element(s) of the electronic device 2101 or may output an instruction or data, received from other element(s) of the electronic device 2101 to a user or another external device, for example.

The display 2160 may include, for example, a liquid crystal display (LCD), a light-emitting diode (LED) display, an organic light-emitting diode (OLED) display, a microelectromechanical systems (MEMS) display or an electronic paper display. The display 2160 may display, for example, various types of content (e.g., text, images, video, icons and symbols) to a user. The display 2160 may include a touch screen, and may receive, for example, a touch, a gesture, proximity or hovering input using an electronic pen or part of the body of a user. The communication interface 2170 may establish communication between the electronic device 2101 and an external device (e.g., the first external communication interface 2102, the second external electronic device 2104, or the server 2106), for example. For example, the communication interface 2170 may be connected to the network 2162 through wireless communication or wired communication, and may communicate with an external device (e.g., the second external electronic device 2104 or the server 2106).

Each of the first and second external electronic devices 2102 and 2104 may be a device having the same type as the electronic device 2101 or having a type different from the type of the electronic device 2101. In accordance with various embodiments, some or all of operations executed in the electronic device 2101 may be executed in another one or a plurality of electronic devices (e.g., the electronic devices 2102 and 2104 and the server 2106). According to one embodiment, if the electronic device 2101 has to perform a function or service automatically or in response to a request, the electronic device 2101 may execute the function or service or additionally request at least some associated functions from another device (e.g., the electronic device 2102, 2104 or the server 2106). Another electronic device (e.g., the electronic device 2102, 2104 or the server 2106) may execute a requested function or additional function and transfer the results thereof to the electronic device 2101. The electronic device 2101 may provide the received results as a requested function or service without any change or may provide the requested function or service by additionally processing the received results. To this end, for example, clouding computing, distributed computing or client-server computing technology may be used.

Figure 7:
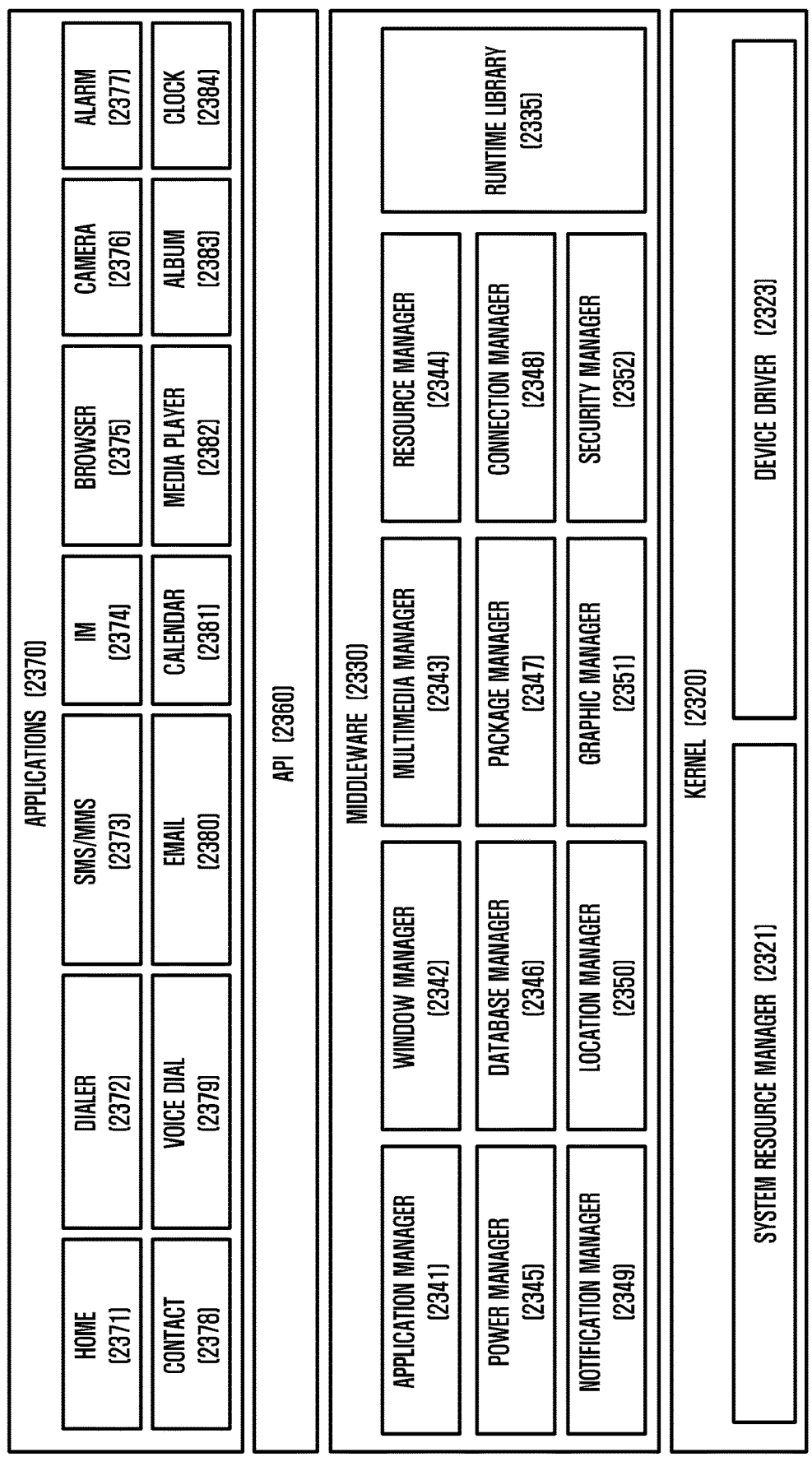
FIG. 7 is a block diagram of a program module according to various embodiments.

FIG. 7 is a block diagram of a program module according to various embodiments of the present disclosure. In accordance with one embodiment, the program module 2310 (e.g., program 2140) may include an operating system (OS)

that controls resources related to an electronic device (e.g., the electronic device 2101) and/or various applications (e.g., the application program 2147) driven on the operating system. The operating system may include, for example, Android™, Windows™, Symbian™, Tizen™ or Bada™. Referring to FIG. 7, the program module 2310 may include a kernel 2320 (e.g., the kernel 2141), middleware 2330 (e.g., the middleware 2143), an API 2360 (e.g., the API 2145) and/or an application 2370 (e.g., the application program 2147). At least some of the program module 2310 may be pre-loaded onto the electronic device or may be downloaded from an external electronic device (e.g., the electronic device 2102, 2104 or the server 2106.

The kernel 2320 may include, for example, a system resource manager 2321 and/or a device driver 2323. The system resource manager 2321 may perform control, allocation or recovery of system resources. In accordance with one embodiment, the system resource manager 2321 may include a process management unit, a memory management unit or a file system management unit. The device driver 2323 may include, for example, a display a driver, a camera driver, a Bluetooth driver, sharing memory driver, a USB driver, a keypad driver, a Wi-Fi driver, an audio driver or an inter-process communication (IPC) driver. The middleware 2330 may provide, for example, a function required by the application 2370 in common or may provide various functions to the application 2370 so that the application 2370 can use limited system resources within the electronic device through the API 2360. In accordance with one embodiment, the middleware 2330 may include at least one of a runtime library 2335, an application manager 2341, a window manager 2342, a multimedia manager 2343, a resource manager 2344, a power manager 2345, a database manager 2346, a package manager 2347, a connectivity manager 2348, a notification manager 2349, a location manager 2350, a graphic manager 2351, or a security manager 2352.

The runtime library 2335 may include a library module used by a compiler in order to add a new function through a programming language while the application 2370 is executed, for example. The runtime library 2335 may perform a function for input/output management, memory management or arithmetic function. The application manager 2341 may manage the life cycle of the application 2370, for example. The window manager 2342 may manage GUI resources used by a screen. The multimedia manager 2343 may identify a format necessary for the playback of various media files and perform the encoding or decoding of a media file using a codec suitable for a corresponding format. The resource manager 2344 may manage the source code or the space of memory. The power manager 2345 may manage the capacity of the battery or power, for example, and may provide power information necessary for the operation of the electronic device. In accordance with one embodiment, the power manager 2345 may operate in conjunction with a basic input/output system (BIOS). The database manager 2346 may generate, search or change a database to be used in the application 2370. The package manager 2347 may manage the installation or update of an application distributed in the form of a package file.

The connectivity manager 2348 may manage a wireless connection, for example. The notification manager 2349 may provide a user with an event, such as a received message, an appointment or proximity notification. The location manager 2350 may manage location information of the electronic device, for example. The graphic manager 2351 may manage a graphic effect to be provided to a user or a user interface related to the graphic effect. The security manager 2352 may provide system security or user authentication. In accordance with one embodiment, the middleware 2330 may include a telephony manager for managing the voice or video communication function of the electronic device or a middleware module capable of forming a combination of the functions of the elements. In accordance with one embodiment, the middleware 2330 may provide a module specified for each type of operating system. The middleware 2330 may dynamically delete some of the existing elements or add new elements. The API 2360 is a set of API programming functions, for example, and may be provided as a different element depending on an operating system. For example, the API may provide one API set for each platform in the case of Android or iOS, and may provide two or more API sets for each platform in the case of Tizen.

The application 2370 may include, for example, a home 2371, a dialer 2372, SMS/MMS 2373, an instant message (IM) 2374, a browser 2375, a camera 2376, an alarm 2377, a contact 2378, a voice dial 2379, e-mail 2380, a calendar 2381, a media player 2382, an album 2383, a watch 2384, and a health care (e.g., measure the quantity of motion or blood sugar) or environment information (e.g., atmospheric pressure, humidity or temperature information) provision application. In accordance with one embodiment, the application 2370 may include an information exchange application capable of supporting information exchange between an electronic device and an external electronic device. The information exchange application may include a notification relay application for delivering specific information to an external electronic device or a device management application for managing an external electronic device, for example. For example, the notification relay application may relay notification information, generated from a different application of an electronic device, to an external electronic device or may receive notification information from an external electronic device and provide it to a user. The device management application may control the function (e.g., the turn-on/turn-off of an external electronic device itself (or some components) or brightness (or resolution) of the display) of an external electronic device communicating with the electronic device, for example, and may install, delete or update an application operating in an external electronic device. In accordance with one embodiment, the application 2370 may include an application (e.g., the health management application of a mobile medical device) selected based on the attributes of an external electronic device. In accordance with one embodiment, the application 2370 may include an application received from an external electronic device. At least some of the program module 2310 may be implemented (e.g., executed) as software, firmware, hardware (e.g., the processor 2210), or a combination of at least two of them, and may include a module, program, routine, instruction sets or a process for performing one or more functions.

The term "module" used in this document includes a unit including hardware, software or firmware, and may be interchangeably used with a term, such as logic, a logical block, a component or a circuit. The "module" may be an integrated part or a minimum unit that performs one or more functions or part thereof. The "module" may be implemented mechanically or electronically, and may include, for example, an application-specific integrated circuit (ASIC) chip, field-programmable gate arrays (FPGAs) or a programmable logic device, which performs some operations and which has been known or is to be developed. At least some of a device (e.g., modules or functions thereof) or a method (e.g., operations) according to various embodiments may be implemented as instructions stored in computer-readable storage media (e.g., the memory 2130) in the form of a program module.

When the instructions are executed by a processor (e.g., the processor 2120), the processor may perform a function corresponding to the instructions. The computer-readable storage media may include a hard disk, a floppy disk, magnetic media (e.g., magnetic tape), optical media (e.g., CD-ROM, a DVD and magneto-optical media (e.g., a floptical disk)), and embedded memory. The instructions may include code produced by a compiler or code capable of being executed by an interpreter. The module or program module according to various embodiments may include at least one of the aforementioned elements, may omit some of the elements, or may further include another element. Operations executed by the module or program module or another element according to various embodiments may be executed in a sequential, parallel, repetitive or heuristic manner, or at least some of the operations may be executed in different order or may be omitted or another operation may be added to the operations.

The invention claimed is:

1. An electronic device, comprising:
    a camera module;
    at least one processor electrically connected to the camera module; and
    a memory electrically connected to the processor,
    wherein when the electronic device operates, the memory stores instructions enabling the processor to:
    generate an image using the camera module, to calculate angles formed by a plurality of straight lines and a virtual horizontal line included in the image, and to select two straight lines based on the calculated angles,
    select a center point of an area comprising the selected two straight lines, and
    select a location of an object detection area in which another transport apparatus is detected based on a location of the selected center point or to change a location of a preset object detection area.

2. The electronic device of claim 1, wherein when the electronic device operates, the memory stores instructions enabling the processor to calculate two angles, belonging to the angles and having a preset value in a difference between absolute values, in order of greater absolute value and to select the virtual horizontal line and the two straight lines forming the two angles.

3. The electronic device of claim 1, wherein when the electronic device operates, the memory stores instructions enabling the processor to perform at least one piece of image processing on the image generated using the camera module and then detect the plurality of straight lines.

4. The electronic device of claim 1, wherein the at least one piece of image processing comprises image processing for converting the image into a black and white image, image processing for extracting an edge from a black and white image, image processing for eliminating noise included in an image, or image processing for detecting a boundary line of an object included in an image.

5. The electronic device of claim 1, wherein:
    the electronic device establishes a communication relation with a transport apparatus, and
    when the electronic device operates, the memory stores instructions enabling the processor to select the area, comprising the selected two straight lines, as a lane in which the transport apparatus is driving.

6. The electronic device of claim 1, wherein when the electronic device operates, the memory stores instructions enabling the processor to set the object detection area in a quadrangle shape of a preset size.

7. The electronic device of claim 6, wherein when the electronic device operates, the memory stores instructions enabling the processor to overlap the set object detection area with an image generated through the camera module and to detect another transport apparatus in a portion included in the object detection area of the image.

8. The electronic device of claim 1, wherein when the electronic device operates, the memory stores instructions enabling the processor to calculate the angles, formed by the plurality of straight lines and the virtual horizontal line, with respect to a preset area of the image.

9. The electronic device of claim 3, wherein:
    the image generated using the camera module comprises a plurality of image frames, and
    when the electronic device operates, the memory stores instructions enabling the processor to perform the image processing process on each of the plurality of image frames and then to detect the plurality of straight lines.

10. A method of controlling an electronic device, comprising:
    generating an image using a camera module;
    detecting a plurality of straight lines included in the generated image; and
    calculating angles formed by the plurality of straight lines and a virtual horizontal line and selecting two straight lines based on the calculated angles;
    selecting a center point of an area comprising the selected two straight lines; and
    selecting a location of an object detection area in which another transport apparatus is detected based on a location of the selected center point or to change a location of a preset object detection area.

11. The method of claim 10, wherein calculating angles formed by the plurality of straight lines and a virtual horizontal line and selecting two straight lines based on the calculated angles comprises:
    calculating two angles, belonging to the angles and having a preset value in a difference between absolute values, in order of greater absolute value, and
    selecting the virtual horizontal line and the two straight lines forming the two angles.

12. The method of claim 10, wherein detecting a plurality of straight lines included in the generated image comprises performing at least one piece of image processing on the generated image and then detecting the plurality of straight lines.

13. The method of claim 10, wherein:
    the electronic device establishes a communication relation with a transport apparatus on which the electronic device is put, and
    the method comprises selecting an area, comprising the selected two straight lines, as a lane in which the transport apparatus on which the electronic device is put is driving.

14. The method of claim 10, comprising calculating the angles, formed by the plurality of straight lines and the virtual horizontal line, with respect to a preset area of the image.

* * * * *